United States Patent Office 3,386,851
Patented June 4, 1968

3,386,851
PREPARATION OF POLYMER-COATED SOLID MATERIALS SUITABLE AS FILLERS FOR ORGANIC POLYMERS
Jerry W. Harlan, R.R. 2, Spring Creek Woods, Lockport, Ill. 60441
No Drawing. Continuation-in-part of application Ser. No. 231,312, Apr. 28, 1960. This application Sept. 16, 1965, Ser. No. 492,684
9 Claims. (Cl. 117—93.31)

This is a continuation-in-part of application Ser. No. 231,312 filed, Sept. 19, 1962, which is a division of application Ser. No. 25,204, filed Apr. 28, 1960, now abandoned.

This invention relates to solid materials having a coating of adherent polymeric materials bonded thereon. More particularly, the invention concerns the preparation of polymer-coated, finely divided, solid materials which are suitable as fillers for normally solid organic polymers.

Natural and synthetic normally solid polymers, such as natural or synthetic rubber, polyethylene, and the like, are commonly filled with finely divided solid materials to improve various physical and chemical properties. For example, natural rubber is usually filled with carbon black or sometimes magnesium carbonate, zinc oxide, etc., to strengthen the final mixture. Also, high density polyethylene is frequently mixed with carbon black to reduce its susceptibility to ultra-violet light-induced oxidations, as well as to improve markedly its physical properties.

Unfortunately, most of the solid filler materials in common use are not wetted by the polymers into which they must be incorporated. Consequently, the machines used for mixing organic polymers with solid fillers, such as Banbury mixers and mixing rolls, must be ruggedly built and carefully controlled. Their power requirements are extraordinary. A primary object of the present invention is to provide finely divided solid materials which, by reason of their adherent surface coatings, may be incorporated into organic polymers with materially reduced operational difficulty and expense. A further object is to provide a method of preparing such finely divided solid materials wherein the coating is adherent and the materials are free flowing. A general object is to increase the wettability of solid fillers by normally solid organic polymers. Other and more particular objects of the invention will be apparent from the ensuing description.

In accordance with one aspect of the invention, there is provided a process for preparing finely divided solid materials having an adherent surface coating of a polymerized hydrocarbon radiation-bonded thereto. This process comprises the steps of adsorbing a radiation polymerizable hydrocarbon, while in vapor form, onto the surface of the solid material, advantageously under conditions effective to establish a surface monolayer. The resulting solid material, with adsorbed hydrocarbon thereon, is then subjected to a dosage from about $10^6$ to about $10^{10}$ rep of beta or gamma rays, based on polymerizable hydrocarbon, at normal room temperature, or higher, after which the solid materials are recovered with a coating of radiation-bonded and crosslinked polymerized hydrocarbon.

The polymerized hydrocarbon coating has a thickness substantially equal to the thickness of the original adsorbed hydrocarbon, and apparently is chemically bonded to the surface of the finely divided solid material as well as being internally crosslinked. Thus a substantial portion of the polymerized hydrocarbon resists removal even by boiling with xylene or by heating under high vacuum.

Finely divided solid materials which are especially useful as fillers for organic polymers are widely known. Among such fillers are the silica gels, carbon blacks, clays, calcium carbonate, magnesium carbonate, zinc oxide, calcium silicate, etc. Carbon, either in the form of carbon black or activated charcoal, is especially advantageous, both with respect to the facility with which it is processed in accordance with the present invention and with respect to the properties which it generally imparts to organic polymers. Although the preferred fillers have particle sizes of below about 200 millimicrons, particle diameters of as much as 1,000 millimicrons, or even more, may be useful in particular circumstances.

Normally solid organic polymers, into which the inventive polymer-coated solid materials may be incorporated, may be either natural or synthetic high polymers which are solid at ambient conditions, i.e., about 70° F. and at atmospheric pressure. The polymers may be either elastomeric, such as natural rubber, or plastic, such as high density (above 0.96 d. 20/4) polyethylene prepared from stereospecific catalysts. Among the more commercially interesting organic polymers which may receive advantageous incorporation of the inventive coated fillers, there may be mentioned the butadiene-styrene copolymers (GRS), polybutadiene, cis-1,4-polyisoprene, neoprene (2-chloro-1,3-butadiene), chloroprene, butadiene-acrylonitrile copolymers, the thiokols or polysulfides, and the various stereospecific polybutadienes. Normally solid polymers wherein the monomeric unit is a vinyl olefin hydrocarbon of the formula $RHC=CH_2$, where R is hydrogen, alkyl, alkenyl or aryl, or combinations thereof, perhaps represent the most common and generally useful polymers. Examples of such polymers are polyethylene, polypropylene, polybutene, polybutadiene, natural or synthetic polyisoprene, polypiperylene, polystyrene-butadiene, poly-alpha-methylstyrene-butadiene, and the like.

For coating the finely divided solid materials with a radiation polymerizable hydrocarbon, a vast number of suitable hydrocarbons are available for use for specific purposes. Many of such hydrocarbons are known, and extensive lists of these appear in for example the presentation entitled: "The Chemical Reactions Inducted by Ionizing Radiation in Various Organic Substances," contained within the report of the Proceedings of the International Conference on the Peaceful Uses of Atomic Energy, volume 7, Geneva, Aug. 8-20, 1955, published by the United Nations in 1956, specifically pp. 526–537. Another compilation appears in the paper by Tolbert et al. entitled: "Radiation Decomposition of Pure Organic Compounds," presented at the symposium on Radiation Sterilization of Foods and Pharmaceuticals, American Chemical Society Meeting, New York, Sept. 13, 1954. While most of these radiation-polymerizable hydrocarbons are olefins, many other suitable hydrocarbons are found in other classes, especially hydrocarbons such as the benzenes, particularly the alkyl benzenes.

Thus, paraffins such as propane, butane, n-hexane, and decane; aromatic hydrocarbons such as benzene, styrene, toluene, orthoxylene, m-xylene, p-xylene, and ethyl benzene; cycloalkanes such as cyclohexane and decahydronaphthalene; as well as olefins such as ethylene, propylene, butene-2, diisobutylene, decene-1, octadecene-1; cycloalkanes such as cyclohexene; alkynes such as decyne-1 and heptadecyne-1, and dienes such as 2,5-dimethylhexadiene-1,5 may be used. Thus, alkanes, alkenes, alkynes, cycloalkanes, cycloalkenes, aryl compounds, alkyl-aryl compounds, aryl alkenyl compounds and the like, advantageously having from 2 to 20 carbon atoms per molecule, may be employed, with some technical preference being given to the alkenes having from 2 to 8 carbon atoms per molecule, particularly the terminal vinyl alkenes such as propylene, butene-1, etc.

Adsorption conditions are dependent upon the nature of the solid material and of the radiation polymerizable hydrocarbon. Such conditions are preferably selected to afford only a surface monolayer adsorption, i.e., the polymerizable hydrocarbon is adsorbed as a layer one molecule thick on the outer surfaces of the solid material. Multi-layer adsorption and adsorption in the interior pores, while not particularly desirable, are nonetheless permissible although a less tightly adherent polymer and less efficient utilization of radiation are obtained thereby.

For most substances undergoing physical adsorption, the Langmuir adsorption isotherm may be referred to for computations involving optimum pressures at any selected temperature. It is well known of course that, for the physical adsorption of most materials, the amount of adsorption initially increases in proportion to pressure, and thereafter approaches a nearly flat or only slightly rising plateau over a wide range of pressures corresponding to monolayer adsorption, and finally increases rather rapidly during the region of multilayer adsorption. It is the relatively flat portion of the adsorption phenomenon which is employed according to optimum practice of the invention. Multilayer adsorption, as well as excessive adsorption within the pores of a solid material, has the disadvantages of affording a low G value (number of molecules reacting per 100 electron volts of an adsorbed radiation), and reduced tendency to form a tight bond with the solid surface.

Accordingly, a very wide range of temperatures and pressures has been found applicable, and successful adsorption has been accomplished at pressure as low as 1 millimeter mercury absolute, and as high as 132 pounds per square inch gauge. Pressures under particular circumstances may range from as little as 0.01 millimeter mercury to as much as 250 p.s.i.g. or higher. The temperatures may be selected correspondingly to afford the desirable monolayer adsorption, and temperatures of from 0° F. to 250° F., preferably 50–120° F., optimally 70–100° F., may be used. The time of contact between the solids and the polymerizable hydrocarbons may be very short, ranging upwards from a few seconds, to as long as desired, keeping in mind of course that a definite equilibrium exists in adsorption.

Radiation which effects the desirable polymerization and bonding of the adsorbed polymerizable hydrocarbon can be either beta particles or gamma electromagnetic radiation, or both types. As employed herein, throughout the specification and claims, the term "beta" relates to electrons, whether derived from nuclear disintegration reactions (beta decay), orbital electron removal (Compton scattering, photoelectric effect), electron generating apparatus (cathode ray tubes, Van de Graaff generators, linear accelerators), or other sources. Likewise, the term "gamma" is taken in its broad sense to denote electromagnetic radiation having a wave length of between about $10^{-8}$ and about $10^{-11}$ cm., from whatever source derived. Gamma rays may be obtained from nuclear disintegration (fission, spallation, beta-gamma decay), fusion, or by the interaction of particulate radiation. The dosage is about $10^6$–$10^{10}$, preferably $10^7$–$10^9$ rep, based on monomer. It is preferred that the radiation source be of sufficient strength to supply at least about $10^6$ rep per hour, the time for radiation preferably being from about 10 minutes to two days or more.

Certain radiation sources are particularly economic when employed herein. Spent nuclear reactor fuel elements emit both gamma and beta rays, with gamma energy predominating. Waste fission products, which are the primary fission fragments and their decay products obtained from nuclear fission processes, are both useful and low-cost sources. Material made radioactive by exposure to neutrons in a nuclear reactor, such as cobalt-60, may be utilized as a high intensity gamma (and low energy beta) source. In large installations, the reactants may be irradiated by the flux in or from a nuclear reactor; if desired, the reactants may constitute all or a part of the moderator for such nuclear reactor.

Radiation induced polymerization should be conducted at normal ambient temperature or higher, preferably about 80° or higher, and as high as 300° F. may be employed. It often is convenient to conduct the radiation in the same vessel, and at the same conditions of pressure and temperature, as employed for adsorption, although this procedure may be deviated from under particular circumstances. It is known that in thermally-initiated polymerizations, changes in temperature will affect the initiation, propagation and termination stages of polymerization. However, in radiation-initiated radical polymerization, the number of radicals formed depends only on the radiation intensity and not appreciably on temperature. Elevated temperatures appear to provide an increase in the propagation rate of polymers and lead to higher molecular weight polymers and larger conversion rates. Thus, for the successful practice of my method, it is necessary that a sufficiently high temperature be used to ensure a propagation rate which will produce polymer in useful quantities. I have found that normal room temperature, that is, 70–80° F., or higher temperatures are satisfactory. At temperatures less than 80° F., the propagation rate becomes progressively lower with decreasing temperature until no detectable polymer is formed. The temperature necessary for formation of a useful polymer coating on a particular substance can be readily determined by a simple experimentation which can be performed by those of ordinary skill in the art.

After irradiation, excess unreacted hydrocarbon and any irradiation decomposition products such as hydrogen or methane gas may be removed by heating, preferably under vacuum, and the unreacted hydrocarbon may be recycled. At this stage, polymerized hydrocarbon is in an adherent form on the surfaces of the solid material irradiated. It may, in this form, be employed directly as a filler for normally solid organic polymers.

An optional feature of the present invention includes the step of extracting unbonded polymer from the coated solid material with a solvent therefor. For example, if a coated solid material is extracted with an aromatic solvent such as xylene at its boiling point, a portion of the polymer will be removed. This portion is less firmly adherent to the solid material, while the portion of polymer remaining on such material is both bonded and crosslinked, affording an extraordinarily tenacious coating. Coated solid material which has been extracted with a solvent, preferably a hydrocarbon solvent, for the unbonded and uncrosslinked polymer is a particularly excellent oleophilic filler for the organic polymers.

EXAMPLE I

In this example, propylene was adsorbed onto silica gel in a multilayer thickness and irradiated with gamma rays to produce a free flowing, finely divided, solid filler.

The silica gel had a surface area of 386 square meters per gram (Brunauer-Emmett-Teller nitrogen adsorption isotherm) and was calcined before using. Into a radiation permeable vessel were introduced 103 grams of silica gel, 30.9 grams of propylene. At 80° F., the propylene pressure was 132 p.s.i.g. Under these conditions, the pressure was sufficient to establish a multilayer coating on the silica gel.

The vessel was irradiated at 80° F. with $90 \times 10^6$ rep of gamma irradiation. After irradiation, the contents were removed and weighed.

The original 30.9 grams of propylene had formed 11.2 grams of polymer on the original 103 grams of silica gel.

The coated silica gel was refluxed with boiling xylene and filtered while hot. It was then acetone washed, dried, and reweighed. It was found that 2.68 grams of polymer was xylene insoluble, corresponding to 2.54 weight percent on silica gel. In other terms, 6.7 grams of polymer per 100,000 square meters of surface has been deposited.

The radiation efficiency for this example was computed and was found to approximate 1,000 for the xylene-insoluble coating. By contrast, the G value for liquid phase propylene polymerization is about 30.

EXAMPLE II

In this example, propylene was adsorbed onto silica gel and polymerized by irradiation.

The silica gel had a surface area of 786 square meters per gram; 180.5 grams of silica gel and 24.5 grams of propylene were introduced into a radiation vessel, the propylene partial pressure being 15 p.s.i.g. Under these conditions the propylene was adsorbed as a surface monolayer, with perhaps some filling of sub-surface pores. The vessel contents received $90 \times 10^6$ rep of gamma irradiation at 80° F.

It was found that 22.3 of the original 24.5 grams of propylene had been polymerized. After xylene extraction as in Example I, it was found that 7.73 grams of xylene insoluble polymer remained, corresponding to 4.1 weight percent of the silica gel. The polymer was present in the amount of 5.5 grams of xylene insoluble polymer per 100,000 square meters of surface. The G value for formation of xylene insoluble coating was 825.

EXAMPLE III

In this example, propylene was adsorbed onto activated charcoal, a form of carbon, and polymerized by irradiation.

Activated charcoal, 133 grams, and 33.9 grams of propylene were introduced into an irradiation vessel. The propylene partial pressure was 15 p.s.i.g., thus affording a surface monolayer with perhaps some sub-surface pore adsorption. The vessel contents received $90 \times 10^6$ rep of gamma irradiation at 80° F.

After irradiation, it was found that 11.3 grams of total polymer had been produced, of which about 6 grams were xylene insoluble, according to the procedure of Example I. This corresponds to about 4% by weight on the activated charcoal, and to a G value of about 200.

EXAMPLE IV

In this example, orthoxylene was adsorbed onto silica gel and irradiated with gamma radiation.

0.5 gram of orthoxylene at 1 millimeter mercury vapor pressure was adsorbed onto 50 cc. of silica gel having a surface area of 786 square meters per gram. The silica gel with adsorbed hydrocarbon thereon, was subjected to gamma irradiation at a dosage of $17 \times 10^6$ rep at 80° F. for about one day. Under these conditions, 0.15 gram of polymer was formed, which could not be removed by heating at 600° F. for 2 hours under vacuum. The efficiency or G value for formation of this polymer was about 100.

The polypropylene-coated (xylene extracted) carbon of Example III is milled into a high density polyethylene to form a 25% master batch. A conventional heated Banbury mill is used, and mixing proceeds easily. A portion of the masterbatch is mixed with additional polyethylene in a single screw extruder and formed into 1″ pipe having a 3 weight percent filler content.

From the foregoing description, it is manifest that there has been provided an exceptionally advantageous way of preparing a polymer coated solid material suitable as a filler for organic polymers. While the invention has been described in some detail in conjunction with specific operating examples, it will be understood that these are by way of illustration only and are not to be considered exclusive with respect to scope or conditions. Accordingly, many variations, modifications, etc., will be apparent to those skilled in the art in light of the foregoing description, and it is intended to embrace such of these as fall within the spirit and broad scope of the appended claims.

I claim:

1. A process for coating a finely divided solid material with an adherent surface coating of a polymerized hydrocarbon, which process comprises adsorbing a radiation-polymerizable hydrocarbon while in vapor form onto the surface of said finely divided solid material, subjecting said finely divided solid material with adsorbed hyrocarbon thereon to a dosage of from about $10^6$ to about $10^{10}$ rep of high energy ionizing radiation selected from the class consisting of beta and gamma rays during a time sufficient to effect polymerization of said radiation-polymerizable hydrocarbon and at a temperature of at least about 70° F., and recovering finely divided solid material with an adherent surface coating of radiation bonded and crosslinked hydrocarbon thereon.

2. Process of claim 1 wherein said finely divided solid material comprises carbon.

3. Process of claim 1 wherein said adsorption is effected under surface monolayer adsorption conditions.

4. Process of claim 1 wherein said radiation-polymerizable hydrocarbon comprises a terminal vinyl olefin having from 2 to 8 carbon atoms inclusive per molecule.

5. Process of claim 4 wherein said olefin is propylene.

6. Process of claim 1 wherein said radiation-polymerizable hydrocarbon is an aromatic hydrocarbon.

7. Process of claim 6 wherein said aromatic hydrocarbon is orthoxylene.

8. In a process for incorporating finely divided solid fillers into normally solid organic polymers, the improvement which comprises the steps, prior to such incorporation, of adsorbing a radiation-polymerizable hydrocarbon while in vapor form onto the surface of said finely divided solid fillers under surface monolayer adsorption conditions, subjecting said finely divided solid fillers with adsorbed hydrocarbon thereon to a dosage of from about $10^6$ to about $10^{10}$ rep of high energy ionizing radiation selected from the class consisting of beta and gamma rays during a time sufficient to effect polymerization and at a temperature within the range of about 70° F. to about 300° F., and recovering finely divided solid fillers with an adherent surface coating of radiation bonded and crosslinked hydrocarbon thereon.

9. Process of claim 8 wherein said dosage is from about $10^7$ to about $10^9$ rep.

References Cited

UNITED STATES PATENTS

| | | | |
|---|---|---|---|
| 2,887,445 | 5/1959 | Calfee et al. | 204—154 |
| 2,947,675 | 8/1960 | Maisel et al. | 204—154 |
| 3,008,886 | 11/1961 | Sarantites | 204—154 |

OTHER REFERENCES

"Use of Radiation to Promote Chemical Reactions," Chemical and Engineering News, vol. 33, No. 14, Apr. 5, 1955 (pp. 1424–1428 relied on).

"Fission Products Utilization," Brookhaven National Laboratory Progress Report; May 1956 (pp. 18 and 19 relied on).

"Production-Cheaper Polyethylene," Chemical and Engineering News; vol. 34, No. 7, November 1956 (p. 5760 relied on).

WILLIAM D. MARTIN, *Primary Examiner.*

MURRAY KATZ, *Examiner.*

S. W. ROTHSTEIN, P. F. ATTAGUILE,
*Assistant Examiners.*